(12) United States Patent
Okawara et al.

(10) Patent No.: US 8,225,070 B2
(45) Date of Patent: Jul. 17, 2012

(54) INFORMATION PROCESSING APPARATUS AND CACHE MEMORY CONTROL METHOD

(75) Inventors: Hideki Okawara, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 12/639,587

(22) Filed: Dec. 16, 2009

(65) Prior Publication Data

US 2010/0095070 A1    Apr. 15, 2010

Related U.S. Application Data

(63) Continuation of application No. PCT/JP2007/062286, filed on Jun. 19, 2007.

(51) Int. Cl.
*G06F 12/08* (2006.01)
(52) U.S. Cl. ........................................ 711/205; 711/137
(58) Field of Classification Search ........................ None
See application file for complete search history.

(56) References Cited

U.S. PATENT DOCUMENTS

| | | | |
|---|---|---|---|
| 6,516,389 B1 | 2/2003 | Uchihori | |
| 6,557,081 B2 * | 4/2003 | Hill et al. | 711/137 |
| 6,678,795 B1 * | 1/2004 | Moreno et al. | 711/137 |
| 6,963,954 B1 | 11/2005 | Trehus et al. | |
| 7,412,566 B2 * | 8/2008 | Lee et al. | 711/137 |
| 2004/0003179 A1 | 1/2004 | Shirahige et al. | |

FOREIGN PATENT DOCUMENTS

| | | |
|---|---|---|
| JP | 2002-182978 | 6/2002 |
| JP | 2002-215456 | 8/2002 |
| JP | 2004-038345 | 2/2004 |

OTHER PUBLICATIONS

International Search Report for corresponding International application PCT/JP2007/062286; mailed Mar. 11, 2008.
Extended European Search Report for corresponding European Application 07767160.0-1229; dated Mar. 3, 2011.

* cited by examiner

*Primary Examiner* — Gary Portka
(74) *Attorney, Agent, or Firm* — Staas & Halsey LLP

(57) ABSTRACT

An information processing apparatus including a main memory and a processor, the processor includes: a cache memory that stores data fetched to the cache memory; an instruction processing unit that accesses a part of the data in the cache memory sub block by sub block; an entry holding unit that holds a plurality of entries including a plurality of block addresses and access history information; and a controller that controls fetching of data from the main memory to the cache memory, while the access by the instruction processing unit to sub blocks of data in a block indicated by another of the entries immediately preceding the one of the entries, in accordance with order of the access from the instruction processing unit to sub blocks in the block indicated by the another of the entries and access history information associated with the one of the entries.

19 Claims, 9 Drawing Sheets

FIG. 2 200

| 63 62........23 22 | 21........8 | | 21........8 | | | | |
|---|---|---|---|---|---|---|---|
| 00000000000 | 10000 | 0000 | 01111 | 0011 | 001 | 1 | 1 | 0 | |
| 000000000001 | 00100 | 0001 | 01110 | 0001 | 010 | 1 | 0 | 0 | |
| 201 | 202 | 203 | 204 | 205 | 206 | 207 | 208 | 209 | 210 |

FIG. 3 300

| 63 62........23 22 | 21........9 | | 21........9 | | | | |
|---|---|---|---|---|---|---|---|
| 00000000000 | 10000 | 0000 | 01111 | 0011 | 001 | 1 | 1 | 0 | |
| 000000000001 | 00100 | 0001 | 01110 | 0001 | 010 | 1 | 0 | 0 | |
| 301 | 302 | 303 | 304 | 305 | 306 | 307 | 308 | 309 | 310 |

FIG. 8

| | 00000 | 00001 | 00010 | 00011 | 00100 | 00101 | 00110 | 00111 | 01000 | 01001 | 01010 | 01011 | 01100 | 01101 | 01110 | 01111 | 10000 | 10001 | 10010 | 10011 | 10100... |
|---|---|---|---|---|---|---|---|---|---|---|---|---|---|---|---|---|---|---|---|---|---|
| TIME A | | NO-1 | | | | | | | | | | | | | | | | | | | |
| TIME A+1 | | | | | | | | | | | | | | | | | | | | | |
| TIME B | | | | NO-2 | | | | | | | | | | | | | | | | | |
| TIME B+1 | | | | | | | | | | | | | | | | | | | | | |
| TIME C | | | | | | | NO-2 | | | | | | | | | | | | | | |
| TIME C+1 | | | | | | | | | | | | | | | | | | | | | |
| TIME D | | | | | | | | YES-2 | | | | | | | | | | | | | |
| TIME D+1 | | | | | | | | | | | | L2PF | | | | | | | | | |

FIG. 9

| | 00000 | 00001 | 00010 | 00011 | 00100 | 00101 | 00110 | 00111 | 01000 | 01001 | 01010 | 01011 | 01100 | 01101 | 01110 | 01111 | 10000 | 10001 | 10010 | 10011 | 10100... |
|---|---|---|---|---|---|---|---|---|---|---|---|---|---|---|---|---|---|---|---|---|---|
| TIME E | | | | | | | NO-2 | | | | | | | | | | | | | | |
| TIME E+1 | | | | | | | | YES-1 | | | | | | | | | | | | | |
| TIME F | | | | | | | | | L1PF | | | | | | | | | | | | |
| TIME F+1 | | | | | | | | | | YES-1 YES-2 | | | | | | | | | | | |
| TIME G | | | | | | | | | | | L1PF | | | | | | | | | | |
| TIME G+1 | | | | | | | | | NO-2 | | | | | | | | | | | | |
| TIME H | | | | | | | | | | | | | | L2PF | | | | | | | |
| TIME H+1 | | | | | | | | | | | YES-1 YES-2 | | | | | | | | | | |
| TIME J | | | | | | | | | | | | L1PF YES-1 | | | | | | | | | |
| TIME J+1 | | | | | | | | | | | | | | | | | | L2PF | | | |
| TIME K | | | | | | | | | | | | | L1PF | | | | | | | | |
| TIME K+1 | | | | | | | | | | | | | | YES-1 YES-2 | | | | | | | |
| TIME L | | | | | | | | | | | | | | | L1PF | | | | | | |
| TIME L+1 | | | | | | | | | | | | | | | | | | | | | L2PF |

INFORMATION PROCESSING APPARATUS AND CACHE MEMORY CONTROL METHOD

CROSS-REFERENCE TO RELATED APPLICATION

This is a continuation of Application PCT/JP2007/062286, filed on Jun. 19, 2007, the entire contents of which are incorporated herein by reference.

FIELD

A certain aspect of the embodiments discussed herein relates to an information processing apparatus and cache memory control methods.

BACKGROUND

With increases in speed of processing of processors, the reduction of time to access a memory has been demanded. One of the solutions for reduction of the time to access a memory may be a prefetch method for, before a processor issues an access request, predicting the address to be requested to access by the processor and holding the data at the address in a cache.

The prefetch method can detect a serial-access pattern when the processor executes a program to perform a memory access to serial addresses. However, detecting a serial-access pattern of accesses is difficult when the access order is reversed across a registration block boundary in a cache memory or when the access addresses are discrete. Under the above circumstances, a detection failure of the access pattern causes the registration of an undesirable access address by the prefetch, which is a problem.

[Patent Document 1] Japanese Laid-open Patent Publication No. 2002-215456

SUMMARY

According to an aspect of an embodiment, an information processing apparatus including a main memory storing data in a plurality of blocks and a processor connected to the main memory, the processor includes: a cache memory that stores data fetched to the cache memory by reading the data out from the main memory block by block, each of the blocks including a plurality of sub blocks; an instruction processing unit that accesses a part of the data in the cache memory sub block by sub block; an entry holding unit that holds a plurality of entries including a plurality of block addresses indicative of blocks of data to be fetched to the cache memory and access history information indicative of access to the blocks of data in the cache memory by the instruction processing unit, respectively; and a controller that controls fetching of data from the main memory to the cache memory so as to determine whether to execute fetching of a block of data indicated by one of the entries in the entry holding unit, while the access by the instruction processing unit to sub blocks of data in a block indicated by another of the entries immediately preceding the one of the entries, in accordance with order of the access from the instruction processing unit to sub blocks in the block indicated by the another of the entries and access history information associated with the one of the entries.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a diagram of an entry format in a prefetch-address queue according to the embodiment;

FIG. 3 illustrates other diagram of an entry format in a prefetch-address queue according to the embodiment;

FIG. 8 illustrates an operation example in memory access from the initial registration to an initial phase;

FIG. 9 illustrates an operation example in memory access in the increasing-order mode; and FIG. 10 illustrates a diagram illustrating the case where an access pattern monitoring unit 106 according to the embodiment detects plural entries in a prefetch-address queue 107.

DESCRIPTION OF EMBODIMENTS

Figure 1:
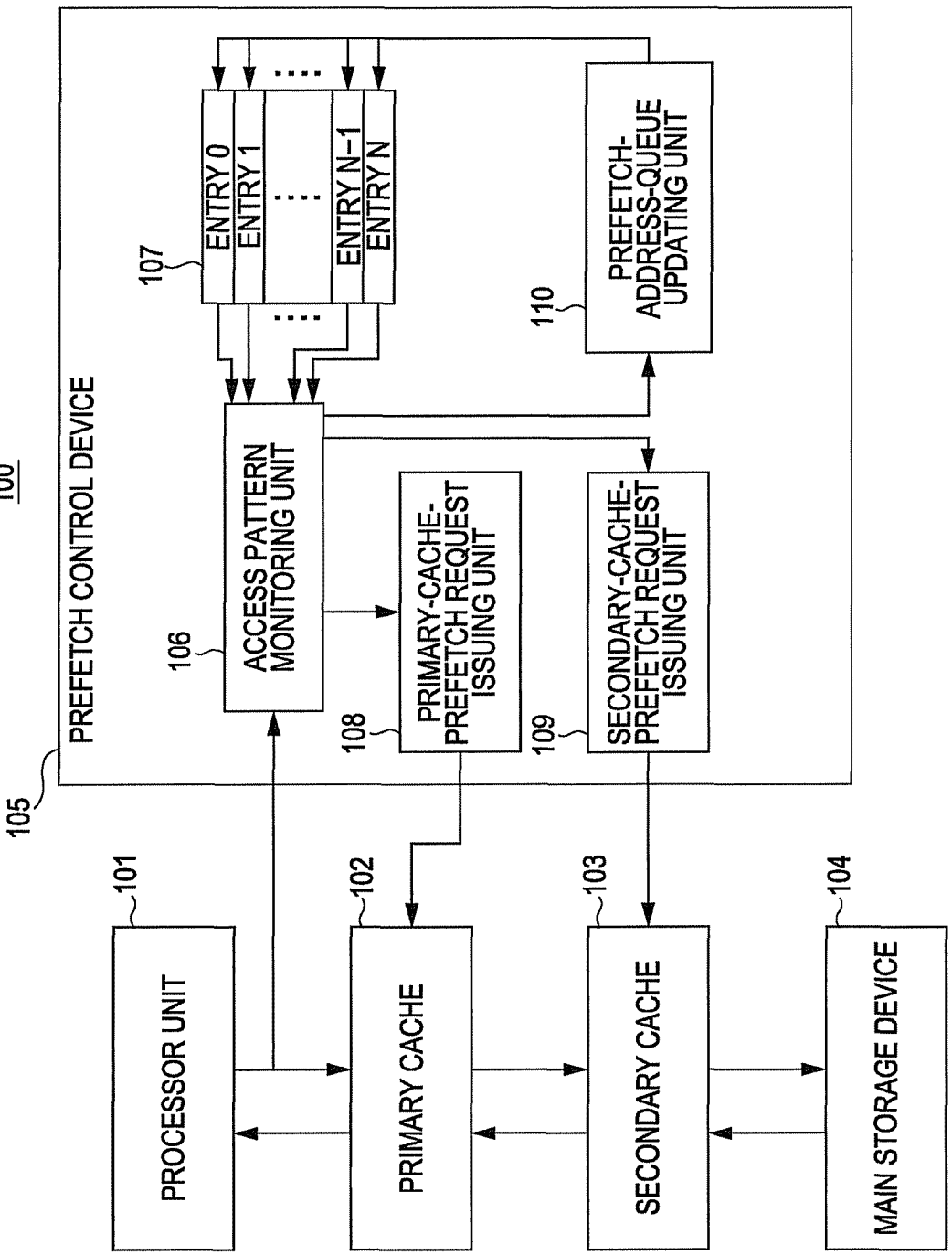
FIG. 1 illustrates a hardware block diagram of an information processing apparatus 100 according to an embodiment.

FIG. 1 illustrates a block diagram of an information processing apparatus 100 according to this embodiment.

The information processing apparatus 100 includes a processor unit 101, a primary cache 102, a secondary cache 103, a main storage device 104 and a prefetch control device 105. The prefetch control device 105 includes an access pattern monitoring unit 106, a prefetch-address queue 107, a primary-cache-prefetch request issuing unit 108, a secondary-cache-prefetch request issuing unit 109 and a prefetch-address-queue updating unit 110. A processor unit 101, a primary cache 102, a secondary cache 103, and a prefetch control device 105 configure a processor, such as CPU (Central processing unit).

The information processing apparatus 100 according to this embodiment has a cache system including the primary cache 102 and secondary cache 103. The information processing apparatus 100 reads an access pattern ahead and prefetches data to the cache system. The term "prefetch" refers to a function that reads data to the primary cache 102 or secondary cache 103 in advance the data reading is executed by the information processing apparatus 100. The prefetch processing executed by the information processing apparatus 100 can increase the processing response speed of the information processing apparatus 100 more greatly than processing that reads data after an instruction to read the data, such as a load instruction, is issued. The information processing apparatus 100 according to this embodiment implements the prefetch function in hardware. The prefetch implemented in hardware includes a hardware device that records an access address pattern. Then, the information processing apparatus 100 performs the prefetch processing, with the access pattern monitoring unit 106 in hardware monitoring access addresses. Alternatively, instead of the implementation in hardware, the prefetch function may be implemented in software. The prefetch in software may be implemented by inserting a prefetch instruction to a source code instruction sequence by a compiler in advance.

The information processing apparatus 100 according to this embodiment can detect an access pattern comprehensively in a wider address range by recording plural serial addresses to one entry in the prefetch-address queue 107 and by recording addresses in units in one entry, the each of the units recorded addresses being larger than a cache block in the secondary cache 103. Thus, the information processing apparatus 100 can detect a serial-access pattern even when the access order is changed locally or the accesses are discrete at predetermined intervals.

Also in the wide address range held by the information processing apparatus 100 according to this embodiment, access history information is held in a unit address range which is more detailed than the cache block, allowing detection of local sequentiality of access.

Since the information processing apparatus 100 can detect a comprehensive serial-access pattern and a local serial-access pattern in one entry, the prefetch to plural hierarchies can be collectively controlled by adjusting the timing for issuing prefetch instruction and/or adjusting the data size for performing the prefetch.

The processor unit 101 is a unit that performs arithmetic processing in the information processing apparatus 100. The arithmetic processing performs a logical operation such as a logical addition and a logical multiply and may be addition, subtraction or multiplication processing. The processor unit 101 is also called an instruction processing unit in this embodiment. The processor unit 101 accesses a part of the data in the cache memory sub block by sub block.

The primary cache 102 is a kind of a memory which can be accessed at a higher speed than that to the secondary cache 103 or main storage device 104. Storing high frequently used data to the primary cache 102 can reduce the number of accesses to the main storage device 104 at a lower access speed and thus can increase the entire speed of the processing by the information processing apparatus 100. The primary cache 102 stores data fetched to the primary cache 102 by reading the data out from the secondary cache 103 block by block, each of the blocks including a plurality of sub blocks.

The secondary cache 103 is a kind of a memory that is slower and has a larger capacity than that of the primary cache 102. In the information processing apparatus 100, the primary cache 102 and secondary cache 103 form a cache memory structure at two levels. According to this embodiment, the registration, update and replacement on the primary cache 102 are controlled in units of 64 byte, and the registration and update on the secondary cache 103 are controlled in units of 256 byte. Thus, the primary cache 102 requests to register data in units of 64 byte to the secondary cache 103, and the primary cache 102 registers the data in units of 64 byte from the secondary cache 103 in accordance with the registration request to the secondary cache 103. The secondary cache 103 requests to register data in units of 256 byte to the main storage device 104, and the secondary cache 103 registers the data in units of 256 byte from the main storage device 104 in accordance with the registration request to the main storage device 104.

The main storage device 104 is a memory that holds entire data to be processed in the information processing apparatus 100 and is a memory that is slower and has a larger capacity than that of the secondary cache 103.

The prefetch control device 105 is an apparatus that registers in advance the data predicted to process by the processor unit 101 with the primary cache 102 or secondary cache 103. The prefetch control device 105 includes, as described above, the access pattern monitoring unit 106, prefetch-address queue 107, primary-cache-prefetch request issuing unit 108, secondary-cache-prefetch request issuing unit 109 and prefetch-address-queue updating unit 110.

The access pattern monitoring unit 106 included in the prefetch control device 105 is a unit that monitors a memory access request instructed by the processor unit 101. The primary cache 102 transfers the data to the processor unit 101, the data corresponding to the memory access request from the processor unit 101.

The prefetch-address queue 107 has a plurality of entries. Each of the entries stores address information, which is 64-bit addresses. FIG. 2, which will be described later, illustrates an entry format in the prefetch-address queue 107 according to this embodiment.

The access pattern monitoring unit 106 is a unit that monitors a memory access request by the processor unit 101. When the processor unit 101 issues a memory access request to the primary cache 102, the access pattern monitoring unit 106 compares the address corresponding to the memory access request and the addresses held in the entries in the prefetch-address queue 107. In accordance with the comparison result, the access pattern monitoring unit 106 instructs the prefetch request to the primary-cache-prefetch request issuing unit 108 and secondary-cache-prefetch request issuing unit 109. The specific criteria for the instruction of a prefetch request will be described later.

The primary-cache-prefetch request issuing unit 108 requests the secondary cache 103 the data to be prefetched to the primary cache 102 on the basis of the instruction by the access pattern monitoring unit 106. The primary cache 102 prefetches the data from the secondary cache 103 in accordance with the prefetch request from the primary-cache-prefetch request issuing unit 108. Here, the prefetch by the primary cache 102 includes, more specifically, issuing a primary-cache registration request from the primary cache 102 to the secondary cache 103 and, in accordance with the primary-cache registration request, transferring the registered data from the secondary cache 103 to the primary cache 102.

The secondary-cache-prefetch request issuing unit 109 requests the secondary cache 103 the data to be prefetched on the basis of the instruction by the access pattern monitoring unit 106. The secondary cache 103 prefetches the data from the main storage device 104 in accordance with the prefetch request from secondary-cache-prefetch request issuing unit 109. Here, the prefetch by the secondary cache 103 includes, more specifically, issuing a secondary-cache registration request from the secondary cache 103 to the main storage device 104 and, in accordance with the secondary-cache registration request, transferring the registered data from the main storage device 104 to the secondary cache 103.

In accordance with the memory access by the processor unit 101, the primary-cache-prefetch request issuing unit 108 and secondary cache-prefetch issuing unit 109 create prefetch addresses in the primary cache 102 and secondary cache 103, respectively. The primary-cache-prefetch request issuing unit 108 and secondary cache-prefetch issuing unit 109 issue prefetch requests to the primary cache 102 and secondary cache 103, respectively.

The prefetch-address-queue updating unit 110 is a unit that updates an entry included in the prefetch-address queue 107. The access pattern monitoring unit 106 holds a memory access pattern. The memory access pattern refers to a pattern of histories on addresses requested for memory access from the processor unit 101 to the primary cache 102. The access pattern monitoring unit 106 acquires the requested addresses when the processor unit 101 issues memory access requests with the addresses to the primary cache 102 and creates the memory access pattern in accordance with the requested addresses. When the access pattern monitoring unit 106 acquires a new memory access request corresponding to new requested addresses from the processor unit 101 to the primary cache 102, the access pattern monitoring unit 106 compares the memory access request and the held memory access pattern. If, as a result of the comparison, the address corresponding to the memory access request is away from the held access pattern, the access pattern monitoring unit 106 newly registers the address information of the current access pattern with the prefetch-address queue 107 and validates the entry. The access pattern monitoring unit 106 determines a neighboring address which the processor unit 101 accesses within a predetermined period of time, the neighboring address being predicted in accordance with a memory access pattern by the access pattern monitoring unit 106.

The prefetch-address-queue updating unit 110 is a unit that updates an entry in the prefetch-address queue 107. The prefetch-address-queue updating unit 110 updates the oldest entry in the prefetch-address queue 107. An entry held in the prefetch-address queue 107 includes a history counter. The prefetch-address queue 107 identifies the oldest entry with reference to the history counter. The history counter is a counter that indicates the order of registration or update on a registrable entry in the prefetch-address queue 107. The history counter may be implemented by using a part of bit included in an entry to express serial numbers. In updating entries in the prefetch-address queue 107, the prefetch-address-queue updating unit 110 deletes the oldest entry (with the highest serial number at the history counter, for example) and registers a new entry in the prefetch-address queue 107. The prefetch-address-queue updating unit 110 further counts up the history counters of entries held in the prefetch-address queue 107. Thus, the information processing apparatus 100 can register an entry or updates an entry in the prefetch-address queue 107. Alternatively, the prefetch-address-queue updating unit 110 may select from invalid entries the entry with which the address corresponding to the prefetch is to be registered. The prefetch-address-queue updating unit 110 determines whether a given entry is an invalid entry or a valid entry on the basis of a flag that included in the entry, the flag indicating the invalidity of the entry.

If the access pattern monitoring unit 106 determines that the serial accesses by the processor unit 101 advance in the direction of gradual increase in address, the access pattern monitoring unit 106 determines that the serial accesses will further advance in the direction of increasing order of addresses and prefetches data at an address near the access address.

Next, the memory access processing in the information processing apparatus 100 will be described. At first the processor unit 101 issues a memory access request to the primary cache 102. The primary cache 102 determines whether the primary cache 102 itself holds the data corresponding to the memory access request from the processor unit 101 or not. If the primary cache 102 determines that the primary cache 102 itself holds the memory access data corresponding to the memory access request, the primary cache 102 transfers the corresponding memory access data to the processor unit 101. If the primary cache 102 determines that the primary cache 102 itself does not hold the memory access data corresponding to the memory access request, the primary cache 102 requests the secondary cache 103 the primary-cache registration of the corresponding memory access data.

The secondary cache 103 determines whether the secondary cache 103 itself holds the memory access data corresponding to the primary-cache registration request or not, similarly to the primary cache 102. If the secondary cache 103 determines that the secondary cache 103 itself holds the memory access data, the secondary cache 103 transfers the memory access data requested to register to the primary cache 102. If the secondary cache 103 determines that the secondary cache 103 itself does not hold the memory access data corresponding to the registration request, the secondary cache 103 requests the main storage device 104 the secondary-cache registration of the corresponding to the memory access data.

The main storage device 104 transfers the memory access data corresponding to the registration request to the secondary cache 103.

The prefetch control device 105 prefetches the memory access data predicted to access by the processor unit 101. Thus, the information processing apparatus 100 can execute faster processes than apparatuses of conventional techniques.

In the prefetch method according to this embodiment, plural serial addresses are recorded in cache lines, and access histories are also recorded in cache lines. Thus, the prefetch method according to this embodiment allows detection of a serial-access pattern in the memory accesses even when the memory access order is reversed across a registration block boundary in a cache memory or the memory access addresses are discrete.

The access pattern monitoring unit 106 monitors a memory access request from the processor unit 101 to the primary cache 102 and creates and holds a memory access pattern. The access pattern monitoring unit 106 reads an entry from the prefetch-address queue 107 and compares the memory access pattern and the addresses included in the entry. In accordance with the comparison result, the primary-cache-prefetch request issuing unit 108 and secondary-cache-prefetch request issuing unit 109 prefetch the data corresponding to the address included in the entry. At that time, the access pattern monitoring unit 106 reads the entry in the prefetch-address queue 107 and instructs the prefetch request to the primary-cache-prefetch request issuing unit 108 and secondary-cache-prefetch request issuing unit 109. The primary-cache-prefetch request issuing unit 108 and secondary-cache-prefetch request issuing unit 109 request to prefetch the data to the primary cache 102 and secondary cache 103, respectively on the basis of the received prefetch request. The prefetch-address-queue updating unit 110 updates the entry in the prefetch-address queue 107. The access pattern monitoring unit 106 instructs the prefetch-address-queue updating unit 110, whereby the prefetch-address-queue updating unit 110 updates the prefetch-address queue 107.

The primary-cache-prefetch request issuing unit 108 and secondary cache-prefetch issuing unit 109 request the primary cache 102 and secondary cache 104, respectively, to prefetch. The primary cache 102 and secondary cache 103 acquire the data predicted as the memory access data by the access pattern monitoring unit 106 in accordance with the prefetch requests to the caches (that is, the primary cache 102 and secondary cache 103). Then, the primary cache 102 and secondary cache 103 prefetch the data predicted as memory access data by the access pattern monitoring unit 106.

FIG. 2 illustrates a format of the entry according to this embodiment. The addresses included in an entry 200 includes a page address 201, an inner page address 202, a registered area access history 203, an inner page address 204, a registered area access history 205, a stride width 206, a valid bit 207, an increasing-order bit 208, a decreasing-order bit 209 and a control bit 210.

The primary cache 102 may be controlled to register, update or replace in units of 64 byte, and the secondary cache 103 may be controlled to register or update in units of 256 byte. The page size for managing the conversion between a physical memory and a virtual memory under virtual memory address control over the main storage device 104 is 4 mega byte, and the entire main storage device 104 is managed with 64-bit addresses.

The address information to be registered with the entry 200 according to this embodiment will be described. The address information is equal to 64 bit (from bit 63 to bit 0), and the address information stores a 42-bit (from bit 63 to bit 22) page address 201, a 14-bit (from bit 21 to bit 8) inner page address 202 and a 14-bit (from bit 21 to bit 8) inner page address 204.

The page address 201 is an address for managing the conversion between a physical memory address and a virtual memory address under the virtual memory address control over the main storage device 104 and is registered before the boundary for the 256 byte, which is the control unit for the secondary cache.

The serial-address range that can be registered with the inner page address 202 and inner page address 204 is equal to 512 byte. Thus, the access pattern monitoring unit 106 can prefetch with one entry the range that has been prefetched with two entries in the past technology, allowing the detection of serial accesses.

Each of the registered-area access history 203 and registered-area access history 205 including 4 bit respectively, and each of the registered-area access history 203 is a history indicating a memory access history in smaller units that is subdivided in four units of 64 byte for the primary cache control. 4 bit in the registered-area access history 203 and registered-area access history 205 correspond to primary-cache control units of 64 byte, respectively. Thus, the access pattern monitoring unit 106 may use the registered area access history 203 and registered area access history 205 to detect local serial accesses from the processor unit 101 to the primary cache 102 and secondary cache 103. The stride width 206 is information describing the address range ahead to be prefetched. The valid bit 207 is information describing whether the corresponding entry is valid or not. The increasing-order bit 208 is information describing serial accesses in an increasing order. The decreasing-order bit 209 is information describing serial memory accesses in a decreasing order. The control bit 210 is information to be used for other address control.

FIG. 3 illustrates a diagram illustrating a format of an entry 300 according to this embodiment. The entry 300 fundamentally has the same format as that of the entry 200, which is one of variations of the entry format.

The prefetch-address queue of the embodiment in FIG. 3 has similar entry format information to that in FIG. 2. However, the inner page address 302 and inner page address 304 are registered in units each of which is up to 1 Kbyte (from bit 21 to bit 9). Thus, an access pattern can be monitored in the 1 Kbyte address range, which is wider than 512 byte range of the entry 200 in FIG. 2. As a result, with the entry 300 in FIG. 3, serial accesses can be detected more comprehensively than that with the entry 200. The entry 300 records access histories in primary cache control units of 64 byte×8. Each of the registered-area access history 303 including 8 bit and registered-area access history 305 including 8 bit is a history indicating an access history in primary-cache control units of 64 byte×8. 8 bit in the registered-area access history 303 and registered-area access history 305 correspond to primary-cache control units of 64 byte, respectively. Thus, the access pattern monitoring unit 106 may use the registered-area access history 303 and registered area access history 305 to detect the local serial accesses from the processor unit 101 to the primary cache 102 and secondary cache 103.

Thus, the information processing apparatus 100 including the cache system according to this embodiment includes mechanism for recording an address corresponding to a memory access in the past to a neighboring address predicted to access in the future and is an apparatus that detects a serial-access pattern on the basis of the comparison between the recorded registered address and a subsequent memory access address and issues a request to prefetch a cache block. The information processing apparatus 100 records a set of a plurality of serial cache block addresses including memory access addresses or memory access addresses in cache block units. Each of the set of a plurality of serial cache block addresses is larger than the cache block, and detects longer serial memory accesses than the cache block unit to control the prefetch.

Figure 4:
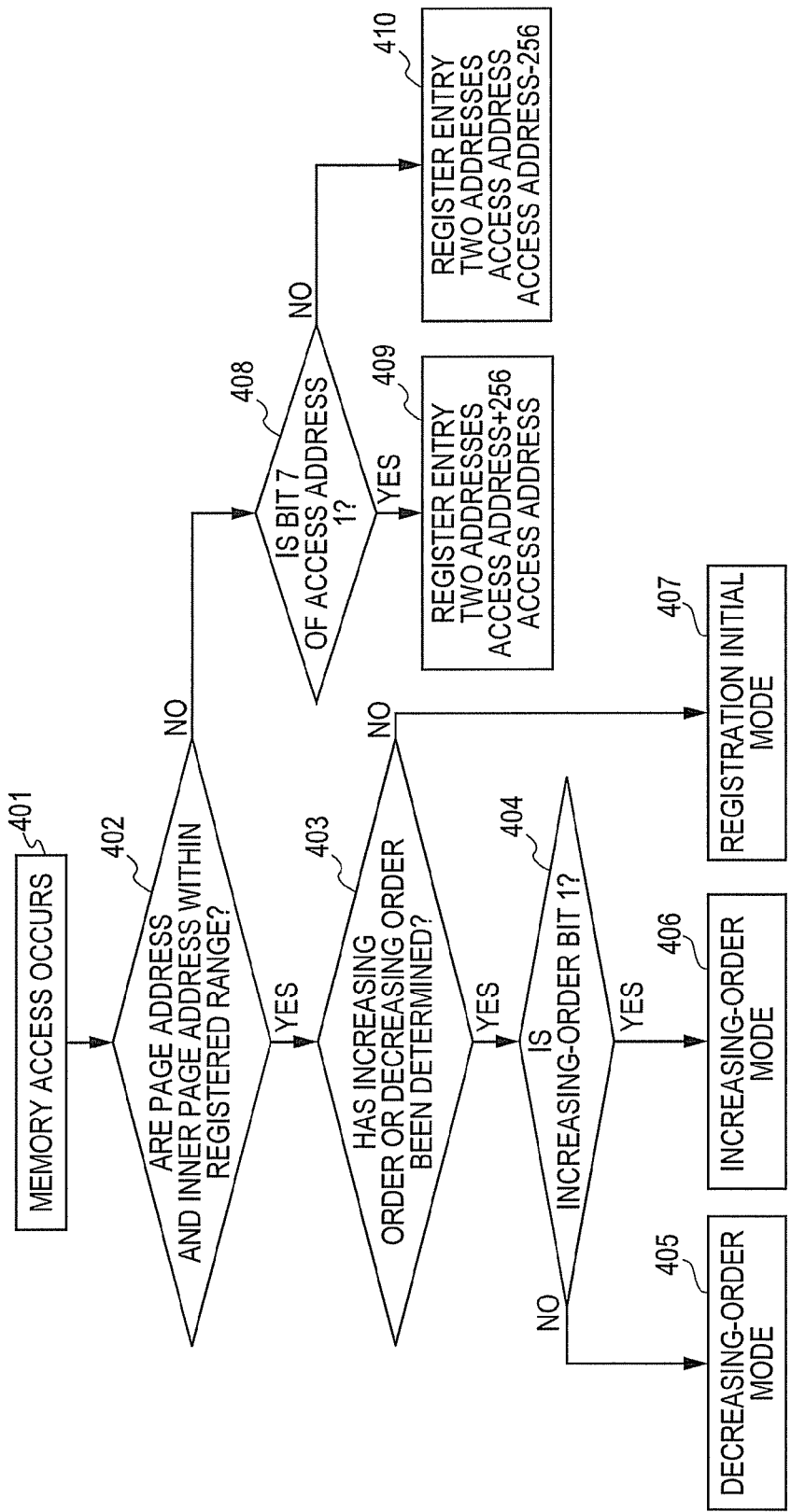
FIG. 4 illustrates an operating flowchart by the prefetch control device in memory access.

FIG. 4 illustrates a flowchart illustrating prefetch control according to this embodiment.

The access pattern monitoring unit 106 monitors a memory access request from the processor unit 101 to the primary cache 102. If the processor unit 101 requests a memory access to the primary cache 102, the access pattern monitoring unit 106 detects the memory access request (step S401). Then, the access pattern monitoring unit 106 determines whether the memory access address corresponding to the memory access request belongs to the registered address range of the entries included in the prefetch-address queue 107 or not (step S402). The valid bit of the entries including the registered address range to be compared with the memory access address is 1. If the memory access address belongs to the registered address range (step S402: YES), the access pattern monitoring unit 106 determines whether the direction of the monitored serial memory accesses has already been determined as that of an increasing order or a decreasing order or not on the basis of the increasing-order bit or decreasing-order bit of the corresponding entry (step S403).

Figure 5:
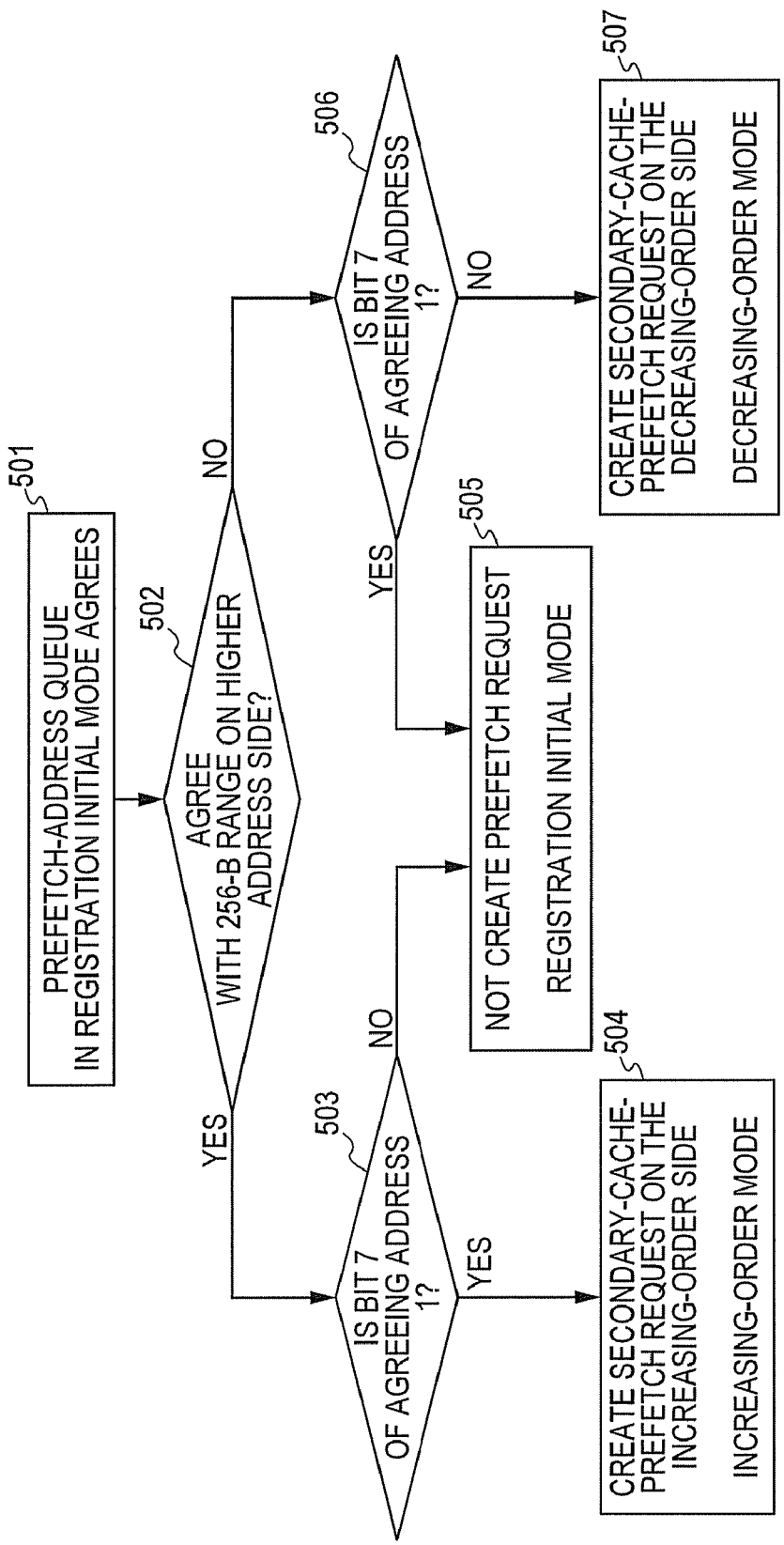
FIG. 5 illustrates an operating flowchart when there is a hit in a prefetch-address queue in the registration initial phase.

If the access pattern monitoring unit 106 determines that the direction of the serial memory accesses has not been determined as an increasing order or decreasing order (step S403: NO), the processing moves to the processing flow in a registration initial mode illustrated in FIG. 5. With reference to FIG. 5, the processing flow in the registration initial mode will be described later.

Figure 6:
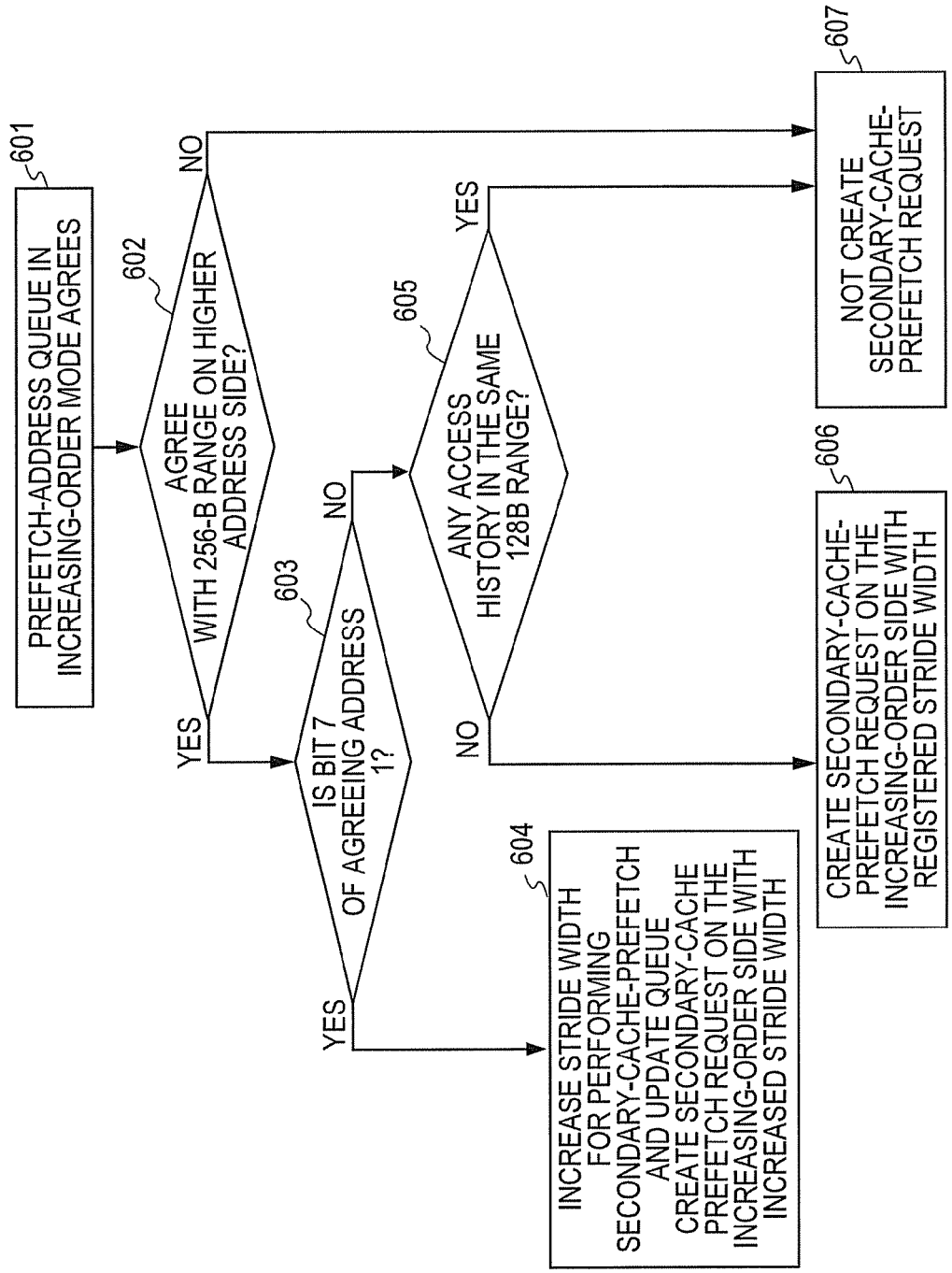
FIG. 6 illustrates a flowchart relating to a secondary cache prefetch in an increasing-order mode.

If the access pattern monitoring unit 106 determines the increasing order or decreasing order of the direction of the serial memory accesses (step S403: YES), the access pattern monitoring unit 106 determines whether the increasing-order bit is 1 or not (step S404). If the access pattern monitoring unit 106 determines that the increasing-order bit is 1 (step S404: YES), the processing moves to the processing flow in an increasing-order mode (step: S406). A processing flowchart in the increasing-order mode is illustrated in FIG. 6. If the access pattern monitoring unit 106 determines that the increasing-order bit is not 1 (or the increasing-order bit is 0) (step S404: NO), the processing moves to the processing flow in a decreasing-order mode (step S405). The processing flow in the decreasing-order mode is a symmetrical processing flow to the processing flow in the increasing order.

The access pattern monitoring unit 106 determines whether the memory access address corresponding to the memory access request belongs to the registered address range of the entries included in the prefetch-address queue or not (step S402). If the memory access address does not belongs to any address in the registered address range and the prefetch-address queue has no addresses belonging to the memory access address (step S402: NO), the prefetch-address-queue updating unit 110 newly registers the memory access address and a neighboring address with the prefetch-address queue 107. Then, the access pattern monitoring unit 106 determines whether the memory access address is the higher side (from 128 byte to 255 byte) of the 256 byte registered access range or the lower side (from 0 byte to 127 byte) of the registered access range. More specifically, whether bit 7 of the access address is 1 or not such that the access address can be located near the center of the address range to be registered with a valid entry in the prefetch-address queue (step S408). In accordance with the state of bit 7 of the access address, the access-monitored pattern monitoring unit 106 determines whether the entry is to be registered with the direction of gradual increase in address (step S409) or the entry is to be registered in the decreasing order in the direction of gradual decrease in address (step S410).

If bit 7 of the memory access address is 1 in step S408 (step S408: YES), a vacant entry in the prefetch-address queue 107 is updated, and the access pattern monitoring unit 106 registers a new memory access address therewith (step S409). The access pattern monitoring unit 106 registers the address resulting from the addition of 256 byte to the memory access address (that is, the memory access address+256 byte) with the inner page address 202 and registers the memory access address with the inner page address 204.

If bit 7 of the memory access address is not 1 (or bit 7 is 0) in step S408 (step S408: NO), a vacant entry in the prefetch-address queue 107 is updated, and the access pattern monitoring unit 106 registers a new memory access address therewith (step S410). This is the registration in the direction of decreasing-order addresses as described above. The memory access address is registered with the inner page address 202, and the address resulting from the subtraction of 256 byte from the access address (that is, memory access address−256 byte) is registered with the inner page address 204.

FIG. 5 illustrates a processing flowchart of the registration initial mode according to this embodiment. The registration initial mode is a mode in which the access pattern monitoring unit 106 performs initial registration. First, an entry in the prefetch-address queue 107 in the registration initial mode agrees with the memory access address (step S501). Then, the access pattern monitoring unit 106 determines whether the memory access address is located on the increasing-order of the increasing-order addresses (or 256 byte on the higher side) or on the decreasing-order of the decreasing order addresses (or 256 byte on the lower side) in the registered address range (step S502). In other words, step S502 is the step of determining the direction of access of the access pattern by the access pattern monitoring unit 106.

If the access pattern monitoring unit 106 determines that the memory access address hits on the increasing-order side (or 256 byte on the increasing order side) (step S502: YES), the memory access pattern monitoring unit 106 determines whether the memory access address has bit 7 equal to "1" or not (step S503). In other words, step S503 is the step of determining by the access pattern monitoring unit 106 whether the direction of the memory access pattern is the direction of increasing order or the direction of decreasing order.

If the access pattern monitoring unit 106 determines that bit 7 is 1 (step S503: YES), the access pattern monitoring unit 106 determines that the direction to be followed by the prefetch-address queue 107 is the increasing order side, and operations are performed in the increasing-order mode thereafter (step S504). In step S504, the memory access by the processor unit 101 advances to the increasing-order side (128 byte on the higher side). Thus, the access pattern monitoring unit 106 determines that the direction to be followed by the corresponding entry is the increasing-order side. Then, the prefetch-address queue 107 performs operations in the increasing-order mode.

Then 256 byte is added to the inner page addresses 202 and 204 in the prefetch-address queue of the corresponding entries to increment the access address. The increasing-order bit 208 is changed to 1, and the decreasing-order bit 209 is changed to 0.

If the access pattern monitoring unit 106 determines that bit 7 is not 1 (or bit 7 is 0) (step S503: NO), the access pattern monitoring unit 106 determines that access pattern is not advancing to either increasing-order side or decreasing-order side and continues operations in the initial mode (step S505). Here, the operations in the initial mode refer to operations in the mode in which a prefetch request is not issued.

Similarly, if the access pattern monitoring unit 106 determines that the memory access address hits on the decreasing-order side (256 byte on the lower side) (step S502: NO), the access pattern monitoring unit 106 determines whether bit 7 of the hit access address is 1 or not (step S506). If the access pattern monitoring unit 106 determines that bit 7 of the hit entry is "1" (step S506: YES), the access pattern monitoring unit 106 determines that the access pattern is not advancing to either increasing-order side or decreasing-order side, and operations in the initial mode are kept (step S505).

If the access pattern monitoring unit 106 determines that bit 7 of the hit entry is "1" (step S506: NO), the access pattern monitoring unit 106 determines that the direction to be followed by the corresponding prefetch-address queue is the decreasing-order side, and operations are performed in the decreasing-order mode thereafter (step S507).

Then, the access pattern monitoring unit 106 subtracts 256 byte from the inner page addresses 202 and 204 of the corresponding entries to decrement the memory access addresses. The access pattern monitoring unit 106 further changes the increasing-order bit 208 of the entries to "0" and the decreasing-order bit 209 of the entries to "1". In step S507, the memory access by the processor unit 101 is reversed to the decreasing-order side (128 byte on the lower side). Thus, the access pattern monitoring unit 106 determines the direction to be followed by the prefetch-address queue 107 is the decreasing-order side and performs operations in the decreasing-order mode.

FIG. 6 illustrates a processing flowchart in the increasing-order mode according to this embodiment. The processing flowchart illustrated in FIG. 6 continues from the step S406 in FIG. 4. The increasing-order mode is the mode in which units of 256 byte are added to the memory access address. The processing flowchart illustrated in FIG. 6 is a processing flowchart for the secondary cache prefetch in the case where the entry in the prefetch-address queue 107 hits on the increasing-order side.

The access pattern monitoring unit 106 first determines that the memory access address hits in the prefetch-address queue 107 in the increasing-order mode (step S601). The access pattern monitoring unit 106 monitors a comprehensive memory access pattern on the increasing-order side (or 256 byte on the higher side) in the registered memory address range and times a secondary-cache prefetch request.

The access pattern monitoring unit 106 determines whether the memory access address is located on the increasing-order side (or 256 byte on the higher side) or the decreasing-order side (or 256 byte on the lower side) in the registered address range (step S602). In other words, the access pattern monitoring unit 106 determines whether the memory access address is going to perform the secondary cache prefetch or the entry information in the prefetch-address queue is to be updated (step S602). Here, the memory access address is the memory address of the data corresponding to an access request from the processor unit 101 to the primary cache 102.

If the access pattern monitoring unit 106 determines that the memory access address is located on the increasing-order side in the registered address range (step S602: YES), the access pattern monitoring unit 106 determines whether bit 7 of the memory access address is 1 or not (step S603). If bit 7 of the memory access address is 1, bit 7 of the registered address range is 1, meaning that the memory access is advancing to the beginning of the registered address range. In an operation in the increasing-order mode, the access pattern monitoring unit 106 monitors a comprehensive memory access pattern on the increasing-order side (or 256 byte on the higher side) and times a secondary-cache prefetch request. The access pattern monitoring unit 106 determines whether the secondary cache prefetch is to be performed or the entry information in the prefetch-address queue 107 is to be update. The entry information refers to all entries to be registered with the prefetch-address queue 107.

If the access pattern monitoring unit 106 determines that bit 7 of the memory access address is 1 (step S603 YES), the access pattern monitoring unit 106 increases the stride width 206 to perform the secondary cache prefetch in secondary cache 103 and updates the entry information in the prefetch-address queue 107 (step S604). When the access pattern monitoring unit 106 determines that the memory access address hits on the increasing-order side and the secondary cache prefetch is to be performed, the access pattern monitoring unit 106 determines whether the memory access has advanced to the beginning of the registered address range or not. If the memory access advances to the beginning of the registered address range as a result of the update in step S604, the prefetch-address-queue updating unit 110 performs the prefetch and advances the entire data held in the prefetch-address queue 107 by 256 byte for update. At that time, the prefetch-address queue 107 is 256 byte while the registered address range is 512 byte. The prefetch-address queue 107 maintains the memory access history information on the 256-byte registered address ranges overlapping before and after the update. If the access pattern monitoring unit 106 determines that bit 7 of the hit entry is not "1" (or bit 7 is "0") (step S603 NO), the access pattern monitoring unit 106 then determines whether any history of the memory access to the 128-byte access address range including the access address or not (step S605).

If the access pattern monitoring unit 106 determines histories of the memory access to the same 128-byte area as the memory access address do not exists (step S605: NO), the access pattern monitoring unit 106 instructs the secondary-cache-prefetch request issuing unit 109 a secondary-cache prefetch request to the increasing-order side with the registered stride width. In accordance with the instruction, the secondary-cache-prefetch request issuing unit 109 creates the secondary-cache prefetch request (step S606).

If the access pattern monitoring unit 106 determines a history of the access to the same 128 byte area as the memory access address does not exist (step S605: YES), the access pattern monitoring unit 106 does not instruct the secondary-cache prefetch request to the secondary-cache-prefetch request issuing unit 109 and records the history of the memory access address (step S607). In all of the cases in step S604, step S606 and step S607, the access pattern monitoring unit 106 records the history of the memory access to the memory access address.

If it is determined that there is no access histories in S606, the information processing apparatus 100 performs the prefetch and updates the entry information such that the stride width for calculating a prefetch address can be increased by 256 byte to push out the data for the future prefetch in step S604. If there is a hit on the decreasing-order side (256 byte on the lower side) of the access address range or if there is a history of the memory access to a 128 byte area even when there is a hit on the increasing-order side of the access address range, the access pattern monitoring unit 106 determines that the serial memory accesses are not advancing and does not request the secondary cache prefetch. Here, the 128 byte area refers to a 128 byte access address range including the memory access address.

Figure 7:
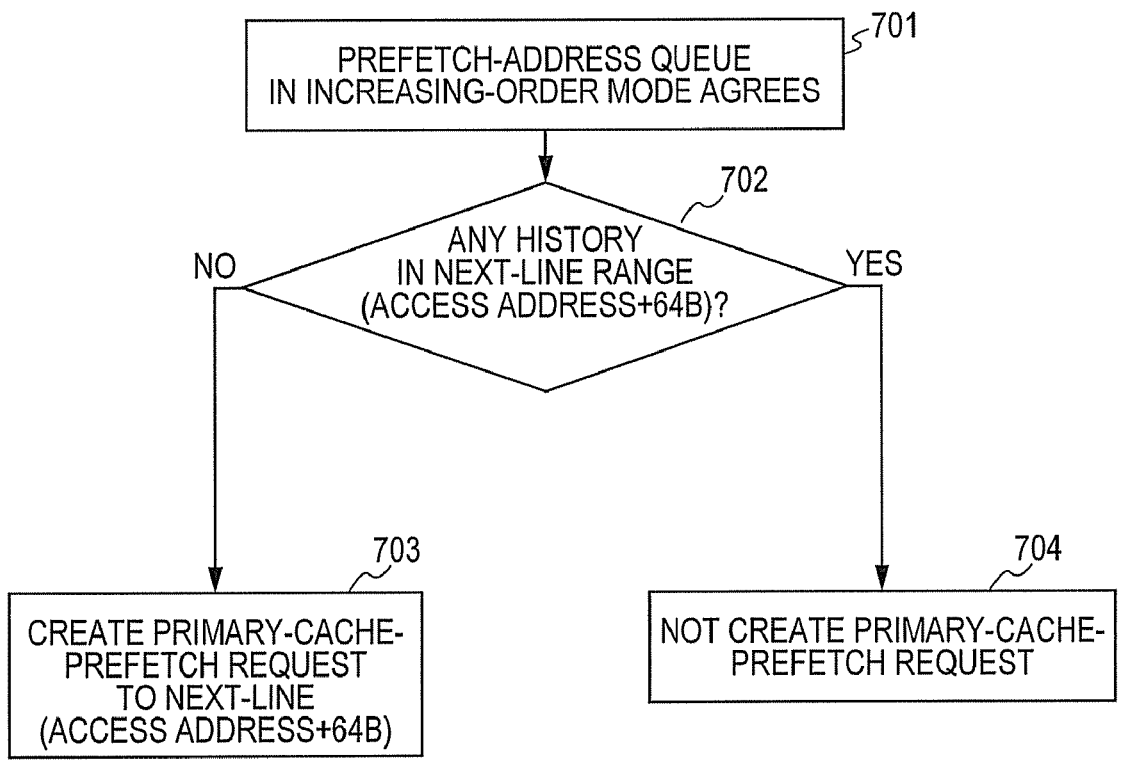
FIG. 7 illustrates a flowchart relating to a primary cache prefetch in the increasing-order mode.

FIG. 7 illustrates a flowchart of the primary cache prefetch in the increasing-order mode according to this embodiment.

The access pattern monitoring unit 106 determines that there is a hit in the prefetch-address queue in the increasing-order mode (step S701). The access pattern monitoring unit 106 determines whether there is a history of the memory access to the primary cache line resulting from the addition of 64 byte to the access address or not (step S702). In operations in the increasing-order mode, the access pattern monitoring unit 106 monitors the memory access history information recorded in units of 64 byte and times a primary cache prefetch request.

If the access pattern monitoring unit 106 determines that there is a history of the memory access to the primary cache line resulting from the addition of 64 byte to the access address (step S702: YES), the access pattern monitoring unit 106 does not create a primary cache prefetch request (step S704) because the processor unit 101 has already performed the memory access. If the access pattern monitoring unit 106 determines that there is not a history of the memory access to the primary cache line resulting from the addition of 64 byte to the access address (step S702: NO), the access pattern monitoring unit 106 creates a primary cache prefetch request (step S703).

The information processing apparatus 100 according to this embodiment performs the following prefetch control hereinafter. The information processing apparatus 100 that implements the prefetch method according to this embodiment includes a cache system. The information processing apparatus 100 according to this embodiment is an information processing apparatus that including mechanism that records the address corresponding to a memory access in the past to a neighboring address expected to access in the future and that detecting a serial-access pattern by the processor unit 101 on the basis of the comparison between the recorded registered address and a subsequent access address and issuing a request to prefetch a cache block. The information processing apparatus 100 records a set of plural serial cache block addresses including access addresses or addresses in block units, each of which is larger than the cache block, and thus detects serial accesses more comprehensively than the cache block unit to control the prefetch.

The information processing apparatus 100 according to this embodiment implements the following prefetch method. The information processing apparatus 100 detects a serial-access pattern by the processor unit 101. Then, the information processing apparatus 100 records detailed access histories in fine-grain sub block units in plural block address ranges, each of which is wider than the cache block registered with one entry registered into the prefetch-address queue 107. Thus, the information processing apparatus 100 requests prefetch by changing the prefetch issuing timing, stride width and prefetch data size in accordance with the degree of the advance of the local memory accesses or the number of memory accesses while the same address area is being registered and performs the prefetch.

The information processing apparatus 100 according to this embodiment implements the following prefetch method. The information processing apparatus 100 detects a serial-access pattern by the processor unit 101 and performs prefetch to the primary cache 102 or secondary cache 103. In the information processing apparatus 100 shares mechanism for recording plural serial block addresses and detailed memory access histories in a registered address range is shared among caches in plural hierarchies. Then, the information processing apparatus 100 controls the comparison address range, prefetch issuing timing and stride width and prefetch data size in accordance with the cache hierarchy and thus controls the prefetch to plural hierarchies with the same resource.

The information processing apparatus 100 according to this embodiment implements the following prefetch method. The information processing apparatus 100 registers the plural address blocks and the histories of memory accesses to the address blocks with one entry registered with the prefetch-address queue 107. When the processor unit 101 serially performs memory access, the beginning address of the address block to be registered with an entry is shifted in the direction of memory access to update. The registered address range before the update and the registered address after the update partially overlap. The beginning address of the registered address block is shifted such that the memory access address by the processor unit 101 can be near the center of the registered address range and continuously uses the detailed histories of memory accesses to the overlapping registered address range. Thus, the information processing apparatus 100 according to this embodiment can control prefetch requests at block boundaries properly.

The information processing apparatus 100 according to this embodiment also implements the following prefetch method. The information processing apparatus 100 detects a serial-access pattern by the processor unit 101 and prefetches data to the primary cache 102 or secondary cache 103. Under the state that an address range is registered with an entry, the information processing apparatus 100 shifts the first prefetched data to the subsequent address by the stride width continuous from the past. The information processing apparatus 100 further holds the address range registered with an entry and performs the second and subsequent prefetches to the addresses after the stride width resulting from the addition of the data size at the previous prefetch to the stride width at the previous prefetch. Thus, the information processing apparatus 100 can increase the degree of the read-ahead operations of the prefetches.

The information processing apparatus 100 according to this embodiment implements the following prefetch method. The information processing apparatus 100 initially registers serial plural address blocks with one entry such that the memory access address can be the center of the registered address range. Then, the information processing apparatus 100 detects either increasing order or the decreasing order in the registered address range that the subsequent memory access advances in. Thus, the information processing apparatus 100 can comprehensively determine the direction of increasing order or the direction of decreasing order in which the serial memory accesses advance.

The information processing apparatus 100 according to this embodiment implements the following prefetch method. When the information processing apparatus 100 detects multihits of memory accesses by the processor unit 101 in the registered address ranges of the plural different entries in the prefetch-address queue 107, the information processing apparatus 100 determines an entry of higher priority and an entry to be invalidated in accordance with the possibility of the detection of the serial memory accesses or the degree of advance of the serial memory access among the multihit entries in the prefetch-address queue 107.

The information processing apparatus 100 according to this embodiment implements the following prefetch method. When the information processing apparatus 100 detects multihits of serial memory accesses in plural different entries in the prefetch-address queue 107 and the multihits are at an entry for which the increasing order or decreasing order of the memory access has not been determined by the information processing apparatus 100 and an entry for which the increasing order or decreasing order of the memory accesses has been determined, the information processing apparatus 100 gives priority to the entry for which the increasing order or decreasing order of the memory access has been determined and invalidates the entry for which the increasing order or decreasing order of the memory accesses have not been determined.

The information processing apparatus 100 according to this embodiment implements the following prefetch method. The information processing apparatus 100 is an information processing apparatus that detects a serial memory access pattern of memory accesses and prefetches to a cache. When the information processing apparatus 100 detects serial memory accesses from multi-hits at plural different entries and the multihits are at entries for which the direction of the serial memory accesses has been determined between the increasing order or the decreasing order, the information processing apparatus 100 invalidates the entries with the multihits on the beginning side of the direction of memory accesses.

FIG. 8 illustrates an operation example from the initial registration of a prefetch queue to the initial mode according to this embodiment. The rows of FIG. 8 have Time A to Time D+1, and the columns of FIG. 8 illustrate the advances of addresses in units of 64 B in the range of binary 5 bit (from 00000 to 10100=0 B to 1280 B). Since FIG. 8 illustrates a behavior for serial memory accesses to neighboring addresses, the addresses have the same higher-order bit and are not illustrated in FIG. 8.

In FIGS. 8 and 9, the hatching area is an area to be registered with the prefetch-address queue 107. The "NO-1" in the memory access address areas mechanism that the memory access addresses do not hit among entries in the prefetch-address queue 107. In the memory access address areas with "YES-1", the primary cache 102 creates a prefetch to the primary cache (L1PF). In the memory access address area with "YES-2", the secondary cache 103 creates a secondary cache prefetch (L2PF). In the memory access address areas with "NO-2", the memory access pattern monitoring unit 106 determines that the memory access address areas hit among the entries in the prefetch-address queue 107, but no prefetch requests are issued to the primary-cache-prefetch request issuing unit 108 and secondary-cache-prefetch request issuing unit 109.

At Time A, the processor unit 101 issues a memory access request to the memory access address area "00010" in the primary cache 102, and the memory access pattern monitoring unit 106 monitors and detects the memory access request to the memory access address area "00010" by the processor unit 101. The memory access address area refers to a cache block including the memory access address corresponding to the memory access request by the processor unit 101. At Time A, the access pattern monitoring unit 106 determines that the memory access address hits among no entries in the prefetch-address queue 107.

At Time A+1, the access pattern monitoring unit 106 registers the memory access address range with an entry in the prefetch-address queue 107. The memory access address range to be registered is 256 byte of "00000 to 00011".

At Time B, the processor unit 101 issues a memory access request to the memory access address area "00011" in the primary cache 102. The access pattern monitoring unit 106 monitors the memory access request to "00011" by the processor unit 101, but does not perform a new prefetch to the primary cache 102 and does not register a new entry with the prefetch-address queue 107 either. At Time B+1, the processor unit 101 does not issue a memory access request to the primary cache 102. At Time B+1, the memory access pattern monitoring unit 106 does not register a new entry with the prefetch-address queue 107.

At Time C, the processor unit 101 issues a memory access request to the memory access address area "00101" in the primary cache 102. The access pattern monitoring unit 106 monitors the memory access request to the "00101" by the processor unit 101, but does not perform a new prefetch to the primary cache 102 and does not register a new entry with the prefetch-address queue 107. At Time C+1, the processor unit 101 does not issue a memory access request to the primary cache 102. In other words, at Time B and Time C, if the access pattern monitoring unit 106 determines the subsequent memory access address hits in an address area of the entries in prefetch-address queue 107, the information processing apparatus 100 moves to the operation flow in the initial mode. The access pattern monitoring unit 106 determines the unnecessity for a prefetch because the serial accesses are not advancing much, and the prefetch control device 105 does not prefetch.

At Time D, the processor unit 101 issues a memory access request to "00111" in the primary cache 102. The access pattern monitoring unit 106 updates entry of the memory access address range "00100 to 01011" with the prefetch-address queue 107. Then, access pattern monitoring unit 106 instructs the secondary-cache-prefetch request issuing unit 109 to issue a prefetch request that requests to prefetch data in the memory access address range "01000 to 01011" to the secondary cache 103. At Time D+1, the processor unit 101 does not perform memory access to the primary cache 102. The secondary cache-prefetch issuing unit 109 requests to prefetch data in the memory access address range "01000 to 01011" to the secondary cache 103. In other words, at Time D, the access pattern monitoring unit 106 determines that the serial memory accesses by the processor unit 101 advance to the increasing-order side of the memory access address range of the entries. Thus, the information processing apparatus 100 prefetches the data after 256 byte to the secondary cache, adds 256 byte to the addresses in the entries in the prefetch-address queue 107, resets the decreasing-order bit to 0 and updates the entries. The entries updated by the access pattern monitoring unit 106 operate in the increasing-order mode.

FIG. 9 illustrates an operation example in the increasing-order mode according to this embodiment. The rows of FIG. 9 have Time E to Time L+1, and the columns of FIG. 9 illustrate the advances of addresses in units of 64 byte in the range of binary 5 bit (from 00000 to 10100=0 B to 1280 B). Since FIG. 9 illustrates a behavior for serial memory accesses to neighboring addresses, the addresses have the same higher-order bit and are not illustrated in FIG. 9.

In FIG. 9, the area surrounded by the thick line is an area to be registered with the prefetch-address queue 107. In the memory access address areas with "YES-1", the primary cache 102 creates a primary cache prefetch (L1PF). In the memory access address area with "YES-2", the secondary cache 103 creates a secondary cache prefetch (L2PF). In the memory access address areas with "NO-2", the access pattern monitoring unit 106 determines that the memory access address areas hits among the entries in the prefetch-address queue 107, but no prefetch requests are issued to the primary-cache-prefetch request issuing unit 108 and secondary-cache-prefetch request issuing unit 109.

At Time E, the address area to be registered with the prefetch-address queue 107 is "00100 to 01011". The processor unit 101 issues a memory request to memory access addresses included in the memory access address area "00110". At Time E+1, the access pattern monitoring unit 106 determines that the memory access address area hits an entry in the prefetch-address queue 107. The access pattern monitoring unit 106 does not issue a prefetch request to the primary-cache-prefetch request issuing unit 108 and the secondary-cache-prefetch request issuing unit 109. This is because there is a history of the memory access to the memory access address area that is the access address+64 byte.

At next Time F, the processor unit 101 issues a memory access request to the memory access address area "00111". At Time F+1, the access pattern monitoring unit 106 instructs the primary-cache-prefetch request issuing unit 108 to request the prefetch to the primary cache. Here, the memory access pattern monitoring unit 106 determines that there is not a memory access history indicating that the memory access address area "01000" that is the memory access address+64 byte has been accessed.

At Time G, the processor unit 101 issues a memory access request to addresses included in the memory access address area "01001". The access pattern monitoring unit 106 performs the secondary cache prefetch to the memory access address area "01100 to 01111" that is the memory access address+256 byte and performs the primary cache prefetch to the memory access address area "01010" that is the memory access address+64 byte.

At Time H, the processor unit 101 issues a memory access request to addresses included in the memory access address area "01000". At Time H+1, the access pattern monitoring unit 106 determines that the memory access address area hits among the entries in the prefetch-address queue 107. The access pattern monitoring unit 106 does not issue a prefetch request to the primary-cache-prefetch request issuing unit 108 and secondary-cache-prefetch request issuing unit 109.

At Time J, the memory access by the processor unit 101 advances, and the processor unit 101 issues a memory request to the memory access addresses included in the memory access address area "01010". Since the m addresses are near the beginning of the registered address range of the prefetch-address queue, the stride width for pushing out data by the prefetch is increased to 512 byte, and the secondary cache prefetch is performed therewith. At the same time, the registered address range of the prefetch-address queue is advanced by 256 byte, and the stride width is also updated to 512 byte. Then, at Time J+1, the memory access pattern monitoring unit 106 instructs the primary-cache-prefetch request issuing unit 108 to issue a prefetch request.

At Time K, the processor unit 101 issues a memory request to the memory access addresses included in the memory access address area "01011". At Time K+1, the memory access pattern monitoring unit 106 instructs the primary-cache-prefetch request issuing unit 108 to issue a prefetch request. Similarly, at Time L, the processor unit 101 issues a memory access request to the addresses included in the memory access address area "01101". The access pattern monitoring unit 106 instructs the primary-cache-prefetch request issuing unit 108 to issue a prefetch request and further instructs the secondary-cache-prefetch request issuing unit 109 to issue a prefetch request. Here, the primary cache 102 prefetches the memory access address area "01110", and the secondary cache 103 prefetches the memory access address area "10100 to 11111".

Figure 10:
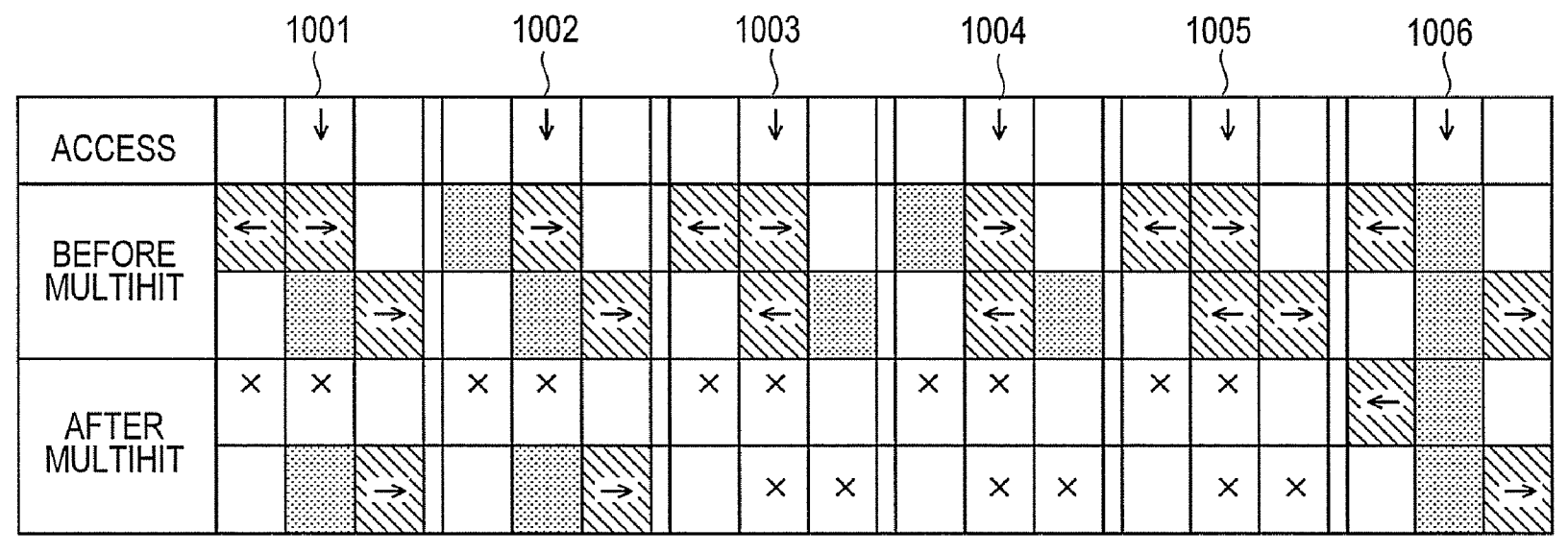

FIG. 10 illustrates a diagram illustrating the case where the access pattern monitoring unit 106 according to this embodiment detects hits among plural entries in the prefetch-address queue 107. The detection of hits among plural entries will be called multihit detection.

The entries which are detected as multihits by the access pattern monitoring unit 106 and for which the direction of increasing order or decreasing order has not been determined are selected by the access pattern monitoring unit 106 with low priority. Thus, when the access pattern monitoring unit 106 detects the multihits among the entries with the arrows indicating both of the directions of increasing order and decreasing order, the entries are invalidated. In FIG. 10, the memory accesses 1001, 1003 and 1005 correspond thereto.

Next, the entries for which the increasing order or decreasing order has been determined and which are multihit-detected on the beginning side of the direction of advance also have low priority and are to be invalidated. In the memory access 1002, the access pattern monitoring unit 106 detects multihits among the plural entries advancing in the same direction of increasing order. In the case of the memory access 1002, the access pattern monitoring unit 106 invalidates the entries hitting on the beginning side of the direction of advance because the entries having the address area on the further beginning side of the direction of advance have priority.

In the memory access 1004, the access pattern monitoring unit 106 detects multihits among plural entries advancing in the opposite direction of that in the increasing order or decreasing order. In the memory access 1004, the access pattern monitoring unit 106 invalidates both of the multihit-detected entries because the address range expected to advance in the future is not known.

In this way, the prefetch control device 105 according to this embodiment can determine an entry to be invalidated effectively on the basis of the degree of serial memory accesses up to the current point when the access pattern monitoring unit 106 detects multihits.

The information processing apparatus 100 according to this embodiment further includes the processor unit 101, the main storage device 104 and a middle storage portion (such as the primary cache 102 and secondary cache 103) to which the data to be processed by the processor unit 101 is cached from the main storage device 104. The information processing apparatus 100 performs cache control over data and further includes the prefetch-address queue 107 that holds plural serial and neighboring addresses as one entry. The plural serial and neighboring addresses include the address in the main storage device 104 or the middle storage portion (which is the primary cache 102 or secondary cache 103) to be accessed by the processor unit 101. The information processing apparatus 100 controls updates such that the address being accessed can be the center of the address range in one entry and controls the access pattern monitoring unit 106 so as to detect that the subsequent memory access advances in the direction of seriality in the registered address range and prefetch.

The information processing apparatus 100 that performs cache control over data includes the processor unit 101, the main storage device 104 that stores data, the middle storage portion (primary cache 102 or secondary cache 103) to which the data to be processed by the processor unit 101 is cached from the main storage device 104 and the prefetch-address queue 107 that holds plural serial and neighboring addresses as one entry information piece including the address in the main storage device 104 or the middle storage portion (or primary cache 102 or secondary cache 103) to be accessed by the processor unit 101 and detects that the addresses in the main storage device 104 or the middle storage portion (or the primary cache 102 or secondary cache 103) to be accessed by the processor unit 101 have advanced to the direction of seriality, prefetches the data and updates the memory access history entry.

The information processing apparatus 100 updates partial addresses only of plural serial addresses held in one entry of the prefetch-address queue 107 so as to gradually advance the address registration range to be held by the entry.

Each of the entries in the prefetch-address queue 107 holds a direction-of-access flag indicating the direction of memory access. The information processing apparatus 100 detects the direction of memory access by the processor unit 101 to the main storage device 104 or the middle storage portion (or the primary cache 102 or secondary cache 103) and controls the direction to prefetch.

Industrial Applicability

The information processing apparatus 100 performs prefetch to increase the processing speed by the information processing apparatus 100. The information processing apparatus 100 is effective for performing prefetch processing when the memory access order is reversed.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. An information processing apparatus comprising:
a main memory storing data in a plurality of blocks; and
a processor connected to the main memory, the processor including:
a cache memory that stores data fetched to the cache memory by reading the data out from the main memory block by block, each of the blocks including a plurality of sub blocks;
an instruction processing unit that accesses a part of the data in the cache memory sub block by sub block;
an entry holding unit that holds a plurality of entries including a plurality of block addresses indicative of blocks of data to be fetched to the cache memory, and access history information indicative of access to the blocks of data in the cache memory by the instruction processing unit, respectively, plural serial addresses being recorded to one entry in the entry holding unit, and each of units of the serial addresses being larger than a cache block in the cache memory; and
a controller that determines whether to execute fetching of a block of data indicated by one of the entries in the entry holding unit and controls fetching of data from the main memory to the cache memory while the instruction processing unit accesses sub blocks of data in a block indicated by another of the entries immediately preceding the one of the entries, in accordance with an order of the accesses from the instruction processing unit to segments in the block indicated by the another of the entries and access history information associated with the one of the entries.

2. The information processing apparatus according to claim 1, wherein the plurality of entries further includes access direction information indicative of a direction of change of the block accessed by the instruction processing unit, respectively.

3. The information processing apparatus according to claim 2, wherein the plurality of entries includes the plurality of block addresses and the access direction information associated with the one of the entries.

4. The information processing apparatus according to claim 1, wherein the controller updates a part of the plurality of block addresses in one of the plurality of entries held in the entry holding unit.

5. The information processing apparatus according to claim 4, wherein the entry holding unit holds entries which includes an updated part of the plurality of block addresses and another part of the plurality of block addresses before an update.

6. The information processing apparatus according to claim 1, wherein the entry holding unit has plural address ranges, each of the address ranges corresponds to one of the blocks; and
the controller updates an address range held in the entry holding unit in accordance with the change of the block to be accessed by the instruction processing unit.

7. The information processing apparatus according to claim 6, wherein the controller updates partial address ranges of the address ranges.

8. The information processing apparatus according to claim 7, wherein the controller holds an updated address range and the address range before an update.

9. The information processing apparatus according to claim 2, wherein the plurality of entries includes an address range corresponding to the each of the blocks and the access direction information associated with the one of the entries.

10. The information processing apparatus according to claim 9, wherein the controller detects at least two entries, determining that one block address of the data to be accessed by the instruction processing unit is included, and when the access direction information in the detected at least two entries is different, the controller resets the access direction information in the detected at least two entries.

11. The information processing apparatus according to claim 9, wherein the address range is a set of serial addresses in the cache memory, and the plurality of entries have a set of address ranges having serial addresses, respectively.

12. The information processing apparatus according to claim 9, wherein the access history information indicates an access to the sub blocks of data in the cache memory by the instruction processing unit.

13. The information processing apparatus according to claim 9, wherein the controller changes a stride width indicating the address range of the data to be read ahead to the cache memory in accordance with an occurrence of an access by the instruction processing unit.

14. The information processing apparatus according to claim 9, wherein the controller sets the address accessed by the instruction processing unit near a center of the plurality of address ranges included in the entry upon updating the entry.

15. The information processing apparatus according to claim 9, wherein when the controller determines that the address being accessed by the instruction processing unit is included in sub address ranges corresponding to the sub blocks in the direction of access, the controller determines the data to be read ahead to the cache memory.

16. The information processing apparatus according to claim 9, wherein the access direction information is an increasing-order bit and a decreasing-order bit, the increasing-order bit and the decreasing-order bit indicating the direction of change of the block to be accessed by the instruction processing unit, respectively.

17. The information processing apparatus according to claim 9, wherein, the controller detects at least two entries, determining that one block address of the data to be accessed by the instruction processing unit is included, and when the one block address of the data on a beginning side in the direction of access includes the address of the data to be accessed by the instruction processing unit, the controller resets the detected at least two entries.

18. A cache memory control method to be performed by an information processing apparatus including a main memory storing data in a plurality of blocks and a processor connected to the main memory, the cache memory control method comprising:
accessing history information indicative of access to the blocks of data in the cache memory, the cache memory holding a plurality of entries including a plurality of block addresses indicative of blocks of data to be fetched to the cache memory by an instruction processing unit, respectively, in an entry holding unit, plural serial addresses being recorded to one entry in the entry holding unit, and each of units of the serial addresses being larger than a cache block in the cache memory; and
determine whether to execute fetching of a block of data indicated by one of the entries in the entry holding unit and fetching data from the main memory to the cache memory, while the instruction processing unit accesses sub blocks of data in a block indicated by another of the plurality of entries immediately preceding one of the entries, in accordance with an order of the accesses from the instruction processing unit to sub blocks in the block indicated by the another of the entries and access history information associated with the one of the entries.

19. A processor included in an information processing apparatus which has a main memory storing data in a plurality of blocks, the processor being connected to the main memory, the processor comprising:
a cache memory that stores data fetched to the cache memory by reading the data out from the main memory block by block, each of the blocks including a plurality of sub blocks;
an instruction processing unit that accesses a part of the data in the cache memory sub block by sub block;
a prefetch address queue that holds a plurality of entries, each of the plurality of entries including a plurality of addresses indicative of global accessed address range and access history information indicative of local access pattern to the sub blocks in registered address range, respectively, the local access pattern being a history in the global accessed address range, plural serial addresses being recorded to one entry in the prefetch address queue, and each of units of the serial addresses being larger than a cache block in the cache memory; and
a controller that determines whether to execute fetching of data indicated by one of the entries in the prefetch address queue and whether to update the entries, and controls fetching of data from the main memory to the cache memory.

* * * * *

UNITED STATES PATENT AND TRADEMARK OFFICE
CERTIFICATE OF CORRECTION

| | | |
|---|---|---|
| PATENT NO. | : 8,225,070 B2 | |
| APPLICATION NO. | : 12/639587 | |
| DATED | : July 17, 2012 | |
| INVENTOR(S) | : Hideki Okawara et al. | |

It is certified that error appears in the above-identified patent and that said Letters Patent is hereby corrected as shown below:

Column 18, Line 63, In Claim 1, delete "memory" and insert -- memory, --, therefor.

Signed and Sealed this
Second Day of October, 2012

David J. Kappos
*Director of the United States Patent and Trademark Office*